(12) United States Patent
Williams (10) Patent No.: US 9,774,683 B2
(45) Date of Patent: Sep. 26, 2017

(54) DEVICE AND METHOD FOR DATA STORAGE USING NETWORK BUFFER

(71) Applicant: Raytheon Applied Signal Technology, Inc., Sunnyvale, CA (US)

(72) Inventor: Charles Williams, Anaheim Hills, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 146 days.

(21) Appl. No.: 14/672,468

(22) Filed: Mar. 30, 2015

(65) Prior Publication Data

US 2016/0294946 A1    Oct. 6, 2016

(51) Int. Cl.
*H01L 29/06* (2006.01)
*H04L 29/08* (2006.01)
*H04L 29/12* (2006.01)
*H04L 29/06* (2006.01)

(52) U.S. Cl.
CPC ...... *H04L 67/1097* (2013.01); *H04L 61/2007* (2013.01); *H04L 63/0428* (2013.01); *H04L 67/06* (2013.01); *H04L 61/6068* (2013.01)

(58) Field of Classification Search
CPC ............. H04L 67/1097; H04L 63/0428; H04L 61/2007; H04L 67/06; H04L 61/6068
See application file for complete search history.

(56) References Cited

U.S. PATENT DOCUMENTS

| | | |
|---|---|---|
| 8,464,334 B1 | 6/2013 | Singhal |
| 8,527,779 B1 | 9/2013 | Easttom, II |
| 2007/0118750 A1* | 5/2007 | Owen .................... H04L 63/126 713/176 |
| 2009/0116445 A1* | 5/2009 | Samar .................... H04W 36/02 370/331 |
| 2013/0191628 A1* | 7/2013 | Nedeltchev ......... H04L 63/0272 713/153 |
| 2014/0016545 A1 | 1/2014 | Jaiswal et al. |
| 2014/0123199 A1* | 5/2014 | Kim .................... H04N 21/6175 725/110 |
| 2015/0372928 A1* | 12/2015 | Basilier ............... H04L 12/4633 370/235 |

OTHER PUBLICATIONS

"IP in IP", [online]. Wikipedia, the free encyclopedia. [retrieved on Mar. 10, 2015]. Retrieved from the Internet: <URL: http://en.wikipedia.org/wiki/IP_in_IP>, (last modified on Dec. 4, 2014), 4 pgs.

(Continued)

*Primary Examiner* — Mohammad Waliullah
(74) *Attorney, Agent, or Firm* — Schwegman Lundberg & Woessner, P.A.

(57) ABSTRACT

Generally discussed herein are systems, apparatuses, and methods for data storage. In one or more embodiments, a method can include parsing a file of a first node connected to a network into payloads of a plurality of Internet Protocol (IP) packets, adding a specified number of random IP headers from a list of IP headers to each of the IP packets, and communicating the IP packets including the IP headers to a second node on the network as determined by a first IP header of a respective IP packet so as to store the packet on the network buffer of the second node.

15 Claims, 5 Drawing Sheets

(56) References Cited

OTHER PUBLICATIONS

Simpson, W., "IP in IP Tunneling", RFC 1853, Network Working Group. [online]. Retrieved from the Internet: <URL: https://tools.ietf.org/html/rfc1853>, (Oct. 1995), 8 pgs.
"International Application Serial No. PCT/US2016/024215, International Search report mailed Jul. 5, 2016", 4 pgs.
"International Application Serial No. PCT/US2016/024215, International Written Opinion.mailed Jul. 5, 2016", 7 pgs.

* cited by examiner

DEVICE AND METHOD FOR DATA STORAGE USING NETWORK BUFFER

TECHNICAL FIELD

Embodiments discussed herein generally relate to data storage using one or more network buffers.

BACKGROUND

A network includes nodes communicatively coupled together to share or transfer data from one node to another node. Data is typically stored on a physical memory. There are many type of data memory devices including primary, secondary, and off-line storage. For example, a hard drive generally stores the majority of data saved to a general purpose computer and is accessible by a central processing unit (CPU) of the computer. In another example, an external hard drive can help store data, such as to keep a backup copy of the data. This data is generally accessed by communicatively connecting the external hard drive to a computer such that the computer's input/output port(s) can access the data on the hard drive. Anyone with physical access to a storage medium can seize and access the data on the storage medium.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to storing data on network buffers of a network. There is a delay between packet transmission and reception between a control node and a destination node. During this delay the data is saved on the network and may not be present on either the control node or the destination node. During this delay, the data is stored on one or more packet buffers of nodes between the two nodes. This time delay and the packet buffers can be used as a data memory, such as by splitting a file in multiple chunks and transmitting each of the multiple chunks to one or more passive nodes between the control node and the destination node.

The description uses Internet Protocol (IP) layer as a descriptive convenience, however embodiments are not limited to the IP network-layer and can be any network-layer protocol as described in International Organization for Standardization/International Electrotechnical Commission (ISO/IEC) 7498-1. Also, reference is made to upper layer protocols (e.g., Transfer Control Protocol (TCP), Transport Layer Security (TLS), and Secure Socket Layer (SSL)), however the methods and systems can be implemented on layer above the network layer as described in ISO/IEC 7498-1.

The file can be removed from the memory of the control node, such as before all or any of the data of the file reaches the destination node. The destination node can then re-assemble the file, such as to re-create the original file, such as by using an assembling instructions file, which can also be stored on the network buffers.

By using multiple layers of IP headers in each packet that, data can be stored on network buffers of the passive nodes. By increasing the number of layers of IP headers, the time the data can be saved on the network can be increased and the amount of data stored on the network buffers can be increased. With a greater time delay between two nodes or between transmission and reception of the data, more data can be saved to the network, thereby increasing the storage capacity of the network, such as to reduce the amount of data stored on the control node. By formalizing a protocol and adding features such as redundancy, error checking, and encryption, a file storage system can be created that is generally limited by the speed of a Network Interface Card (NIC) and latency between nodes.

A control node of a network can initiate a data packet transmission to a destination node. The control node can configure the data transmission such that the data is to pass to multiple passive nodes before being picked up at the destination node. A passive node can "pickup" the data packet, remove a header associated with the passive node, and transmit the data packet to the node associated with a next header of the packet. The destination node can receive the data and retransmit the data over the network through another plurality of passive nodes and/or back to the control node. The control node and the destination node can be the same node and the control node and the destination node can act as a passive node. The data of the data packet can be stored on the network for the time it is in the network buffers and not at the control node. The control node can repeat the process of adding IP headers and re-transmitting the packet over the network, such that the data remains stored on the network buffers of the nodes.

Figure 1:
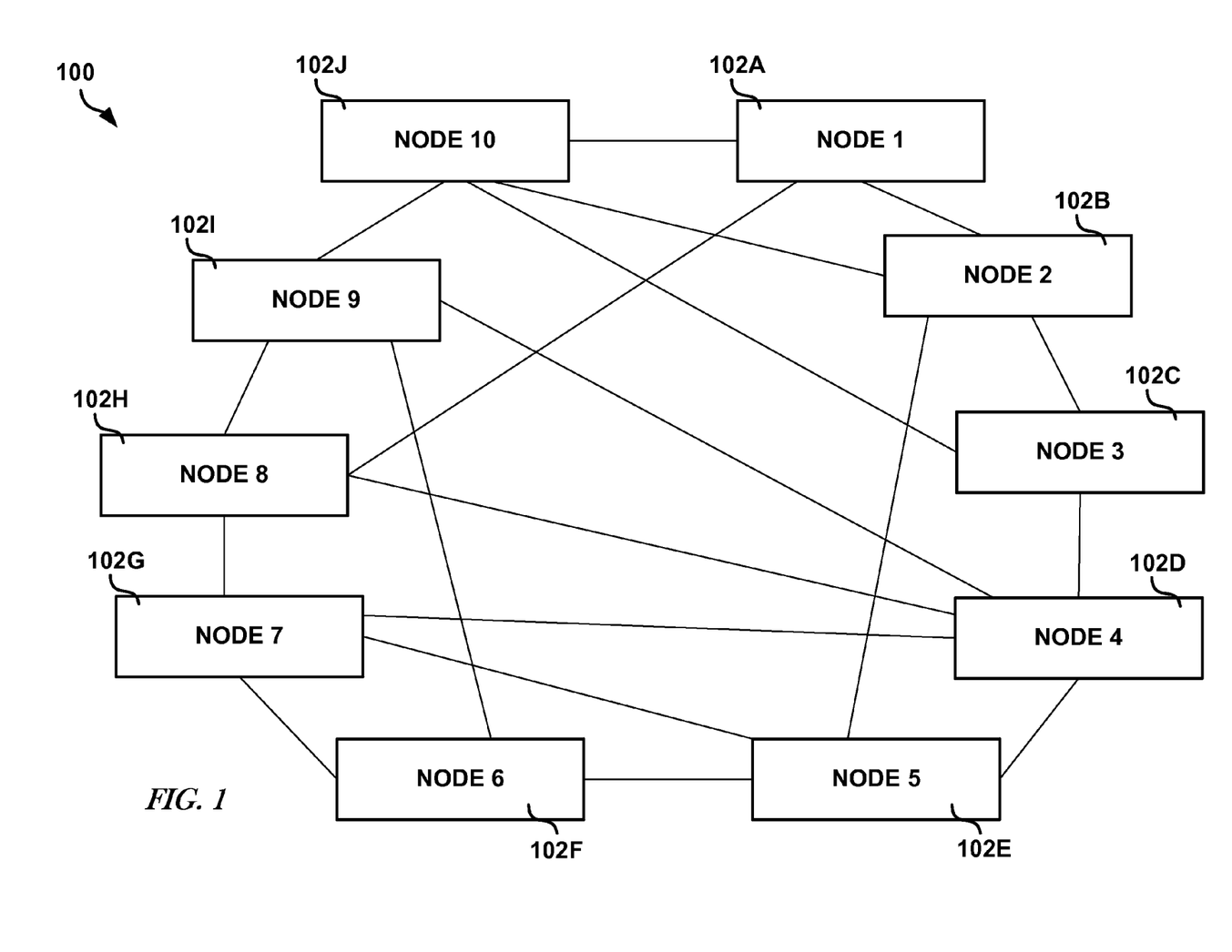
FIG. 1 illustrates, by way of example, a block diagram of an embodiment of a network of nodes.

FIG. 1 illustrates, by way of example, a block diagram of an embodiment of a network of nodes 100. The network of nodes 100 as illustrated includes a plurality of nodes 102A, 102B, 102C, 102D, 102E, 102F, 102G, 102H, 102I, and 102J. The lines connecting the nodes 102A-J each represent a communicative coupling between the nodes 102A-J.

The nodes 102A-J can each be a device that can connect to a network and is capable of receiving and/or transmitting data to another node of the network. The node 102A-J can be a modem, hub, bridge, or switch, telephone (mobile phone, desktop phone, or the like), a minter, router, workstation, a server, or the like, in the context of memory storage using the network buffers, nodes can be broken into two categories: 1) control nodes and 2) passive nodes. A control node is the node that initiates a packet transmission, configures the headers of a packet, is a destination node of the packet that can reassemble the packets into the file, and; or can terminate a packet transmission after it has been initiated. A passive node is a node that receives the packet, removes the outermost header of the packer (i.e. the header of the packet that indicates the passive node is to pickup the packet) and re-transmit the packet. The next packet header under the outermost header includes information identifying which node will pick up the packet next.

The node 102A-J can receive a packet from a control node. The node 102A-J can optionally provide an acknowledgment communication to the control node in response to receiving the packet. The control node can remove data from the control node in response to receiving the acknowledgment communication. The data removed can include the file that the payload of the packet corresponds to or just the data that is in the payload of the packet that was acknowledged.

Figure 2:
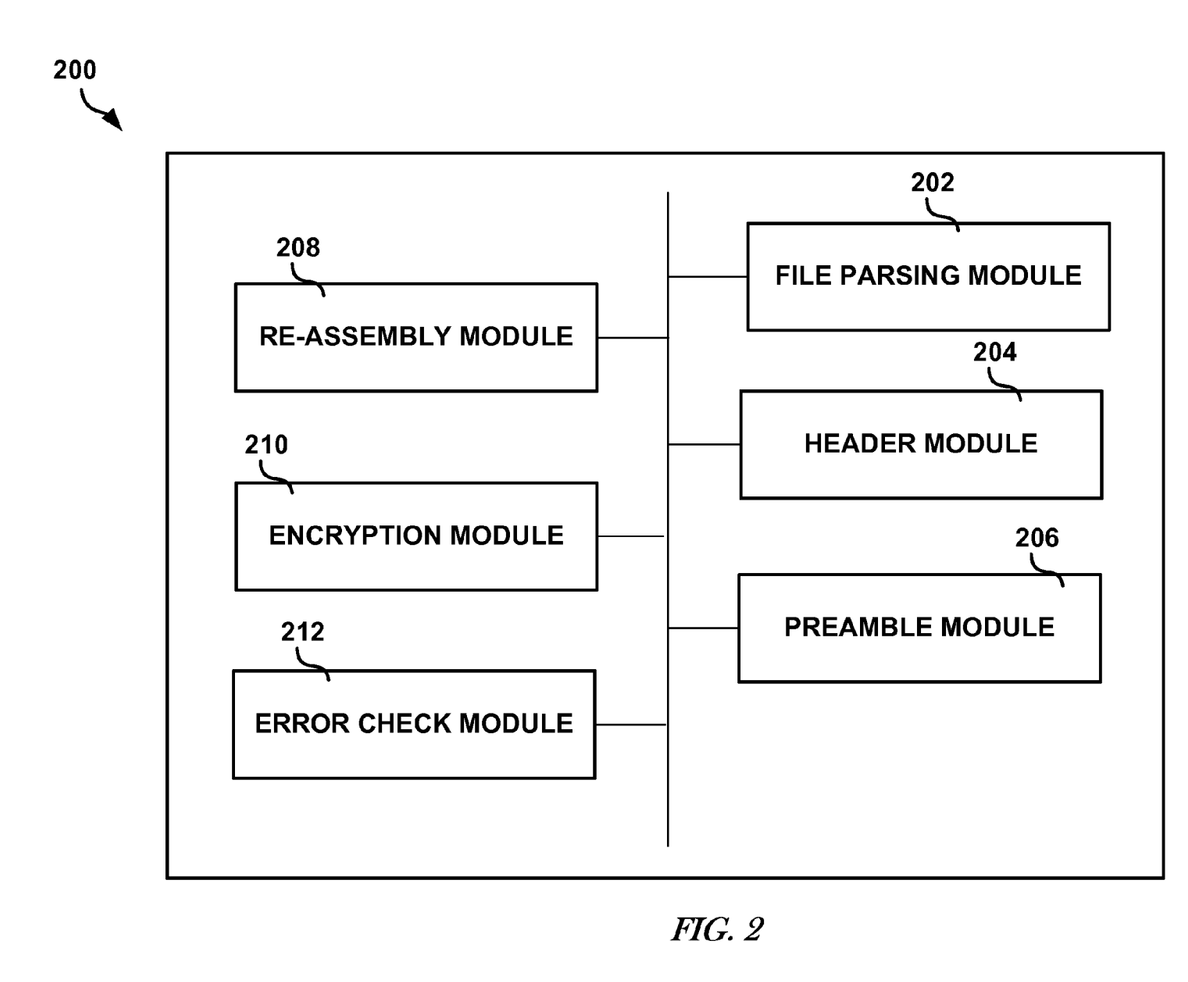
FIG. 2 illustrates, by way of example, a block diagram of an embodiment of a control node.

FIG. 2 illustrates, by way of example, a block diagram of an embodiment of a control node 200. The control node 200 can be any of the nodes 102A-J (FIG. 1). The control node 200 as illustrated includes a file parsing module 202, a header module 204, a preamble module 206, a re-assembly module 208, an encryption module 210, and an error check module 212.

The file parsing module 202 can take a file as an input and produce a plurality of file segments as an output. The file segments combined can include the entirety of the file. The file segments can form at least a portion of a payload of a packet. The file segments can be of equal or different lengths. The file segments can include contiguous data from the file or can include non-contiguous data of the file. For example, consider a file that includes the text "Hello World". In an embodiment in which the file segments include contiguous data, one file segment can include the text "Hello" and the another file segment can include the text "World". In an embodiment in which the file segments do not include contiguous data, one file segment can include the text "HWeol" and another file segment can include the text "rllod".

The file parsing module 202 can parse a file based on one or more heuristics. The heuristics can indicate how a file was parsed and can be used by the re-assembly module 208 in re-assembling the file.

The header module 204 can configure the headers of a packet to include addresses of a plurality of passive nodes before a header including the address of the destination node of the packet. The header module 204 can choose headers (e.g., at random) from a file or list of headers. The file or list of headers can include headers of nodes of the network, such as can include headers including addresses of nodes that are trusted. The file of headers can exclude or indicate whether a node is trusted or is suspicious. The header module 204 can choose headers of only those nodes that are indicated as trusted or are not indicated as being suspicious.

The preamble module 206 adds data to the payload of a packet that identifies a file the data in the payload of the packet is from and/or its relation to other data of the file. For example, the preamble can indicate that the data in the payload corresponds to the first data in the file, the last data in the file, or intermediate data in the file. The re-assembly module 208 can use the preamble to help in re-assembling the file. The preamble 208 can be a hash value or other value that can be looked up to determine what file the data in the payload corresponds to and/or the location of the data in the file.

The re-assembly module 208 uses the heuristics and/or the preamble of a packet to assemble packets into a file. In one or more embodiments, the re-assembly module 208 can lookup a preamble in a database to determine the file the payload corresponds to and/or the location in the file the payload belongs. In one or more embodiments, the re-assembly module 208 can decode the preamble to determine the file the payload corresponds to and/or the location in the file at which the payload belongs.

The encryption module 210 encrypts data for security. The encryption module 210 can provide a decryption key for use by a destination node in decrypting the encrypted data. The encryption module 210 can encrypt a payload (e.g., with or without the preamble).

The error check module 212 can help with the detection and/or correction of an error in data received or transmitted at the control node 200. The error check module 212 can add an error correcting code (ECC) to a payload or other packet data. The ECC can be used, such as by the error check module 214, to determine if the data received includes an error. The ECC can be used, such as by the error check module 212, to correct an error in the data. The ECC can be a block ECC code, a convolutional code, a low density parity check, interleaving, a redundancy check (e.g., a cyclic redundancy check), and/or a concatenated code. A combination of block and convolutional codes is generally referred to as a concatenated code. The concatenated code can employ a convolutional code followed by a block code. A block code operates on a fixed size block of data and a convolutional code operates on arbitrary amounts of data. Examples of ECC techniques include, for example, Reed-Solomon coding, Golay coding, Bose, Chaudhuri, and Hocquenghem (BCH) coding, multidimensional parity check, Hamming code, Viterbi, MAP, Raptor, Raptor Q, and/or Bahl, Cocke, Jelinek, and/or Raviv (BCJR) coding.

The error check module 212 can correct data received based on the ECC and provide the corrected data, such as can be used by the re-assembly module 208 in reassembling the file or by the header module 204. The header module 204 can add headers to the corrected data before the data is re-transmitted from the node 200.

Figure 3:
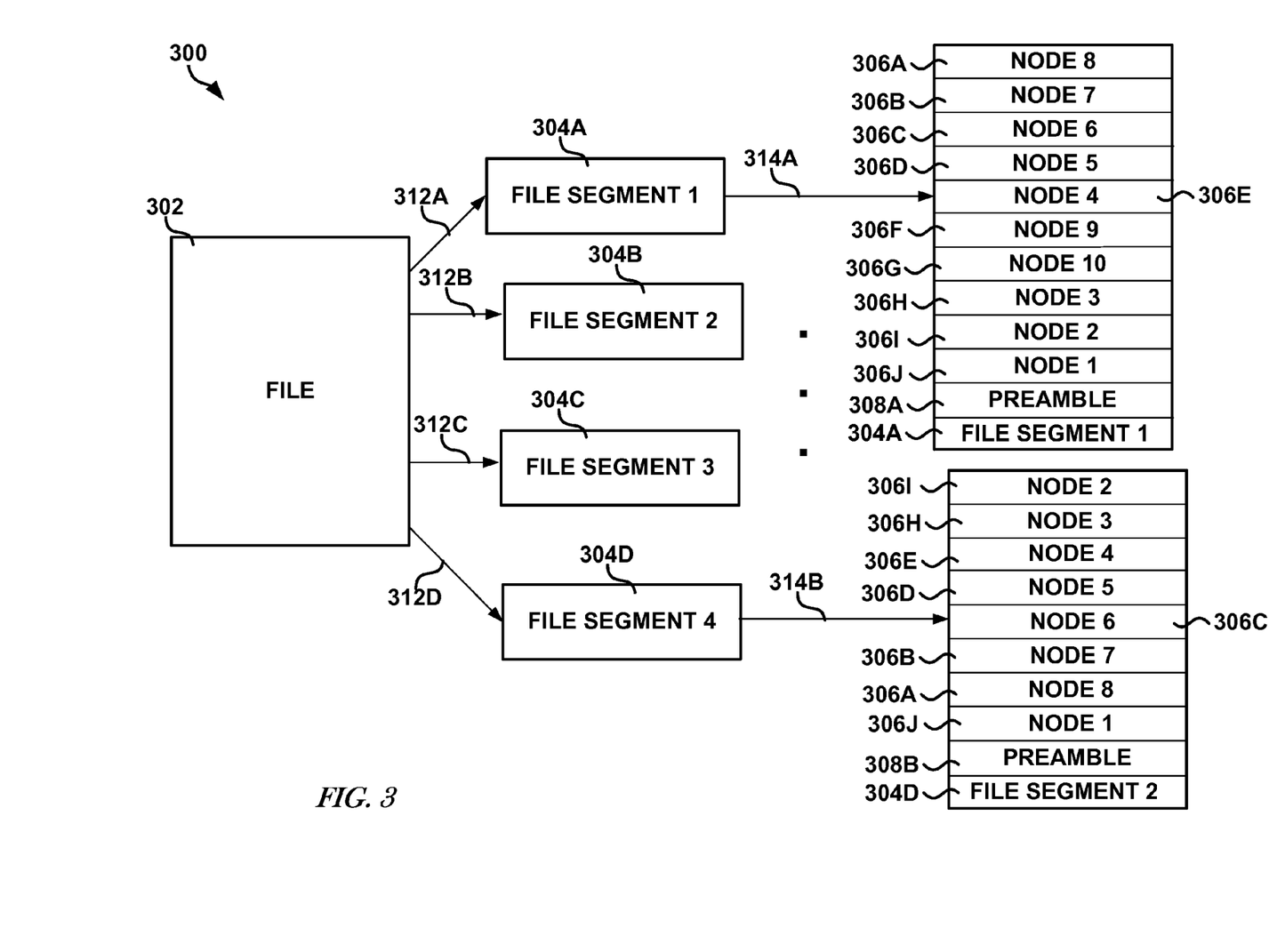
FIG. 3 illustrates, by way of example, a data flow diagram of an embodiment of a data processing technique.

FIG. 3 illustrates, by way of example, a data flow diagram of an embodiment of a data processing technique 300. A file 302 can be parsed into a plurality of file segments 304A, 304B, 304C, and 304D, such as is indicated by the lines 312A, 312B, 312C, and 312D, respectively. The file 302 can be parsed into the file segments 304A-D by the file parsing module 202 (FIG. 2). As used herein a file means any collection of bits. A file can be data stored in one or more addresses of a memory device or streamed from a device, for example.

Each file segment 304A-D can be processed (e.g., by the header module 204, and/or the preamble module 206 (FIG. 2)) to produce a packet of data configured for transmitting to another node on the network, as indicated by the lines 314A and 314B. The transformation of the file segments 304B and 304C are not shown so as to not obscure the FIG.

Each packet can include a plurality of headers 306A, 306B, 306C, 306D, 306E, 306F, 306G, 306H, 306I, and/or 306J. The headers 306A-J can be compliant with a network communication protocol and indicate an address of a node to receive the packet. The packet can be an Internet Protocol Version Four (IPV4) or an IP Version Six (IPV6) packet. The routing extension header of IPV6 can be used to indicate the plurality of passive nodes that the packet is to be picked up by before reaching the destination node.

Each packet can include a pre-specified number of headers or a random number of headers, such as a random number of headers within a predefined range of headers. The headers added to a packet can be pre-defined, determined based on heuristic, or randomly chosen. Choosing a header (e.g., randomly or based on a heuristic) can include choosing a header at random from a file or list of headers. The file or list of headers can include headers corresponding to nodes that are trusted or not yet determined to be suspicious, such as by an administrator. A suspicious node is a node that is determined or suspected of being associated with propagating malware or sniffing traffic.

Each packet can include a preamble 308A, 308B, such as can be created by the preamble module 206 (FIG. 2). The preamble 308A-B can identify (e.g., uniquely identify) the file segment 304A-D, the file 302, and/or the location in the file that the data in the payload (not including the preamble) of the packet corresponds to. The payload of a packet can include the file segment data from the file segment 304A-D. The payload of a packet can additionally include the preamble 308A-B. The payload of a packet can additionally include any data added by the error check module (FIG. 2) to help in ensuring accuracy of the data in the payload.

The preamble 308A-B and/or the file segment 304A-D of the packet can be encrypted, such as by the encryption module 210 (FIG. 2). The payload of the packet can include extra data that can be used to verify that the data received at a destination node is either accurate or can be used to determine what the data should be in case of an error in the data. The extra data can be provided by the error check module 212 (FIG. 2). The payload of a packet can include re-assembly instructions for packets. The re-assembly instructions can identify the preambles associated with the packets, instructions on how to interpret the preambles, a heuristic to follow to re-assemble the file, and/or a decryption key to decrypt the data in the payload. The re-assembly instructions can be provided by the re-assembly module 208 (FIG. 2).

In one or more embodiments, the packet can be masqueraded as a Secure Socket Layer (SSL) or Transport Security Layer (TSL) packet, such as by configuring the packet to be consistent with the Internet Engineering Task Force (IETF) standard RFC 5246, RFC 6101, and/or RFC 6176. Masquerading as TCP/SSL/TLS can include adding a header between the IP header and the payload and populating the header with data (e.g., random or false data). In one or more embodiments the packets can be masqueraded as Transmission Control Protocol (TCP) traffic, such as by configuring the packets to conform to a TCP/IP specification, such as can include RFC 675, RFC 793, RFC 1122, RFC 2581, and/or RFC 3168.

The packets of FIG. 3 are both configured to return to node 1 after the packets have been picked up by the nodes corresponding to the headers of the packets. The destination node (the node corresponding to the last header, i.e. the innermost header, of the headers in the packet) in the example packets is node 1 102A (FIG. 1) (the node corresponding to the header 306J).

Consider the packet including the preamble 308A in FIG. 3. Assume the node 102A has configured the packet and transmitted the packet through its output port. The packet will be picked up by node 102H, since the header 306A includes the address associated with the node 102H. The node 102H will remove the header 306A from the packet and transmit the packet. The packet will then be picked up by the node 102G, since the header 306B includes the address associated with the node 102G. The node 102G will then remove the outermost header (the header 306B at this point in the process) and transmit the packet. The process will continue until the packet is picked up by the destination node (a control node). The header corresponding to the destination node can be the innermost header (header 306J in this example) or another header in the headers of the packet, such as to obfuscate which header corresponds to the destination header. The destination node will then re-assemble the file, such as after all the packets corresponding to the file are received, or build another packet with the data of the preamble and/or file segment as a payload and including a plurality of headers (same or different headers than were previously used for the packet). The destination node can then transmit the packet over the network to again save the packet to the network.

Figure 4:
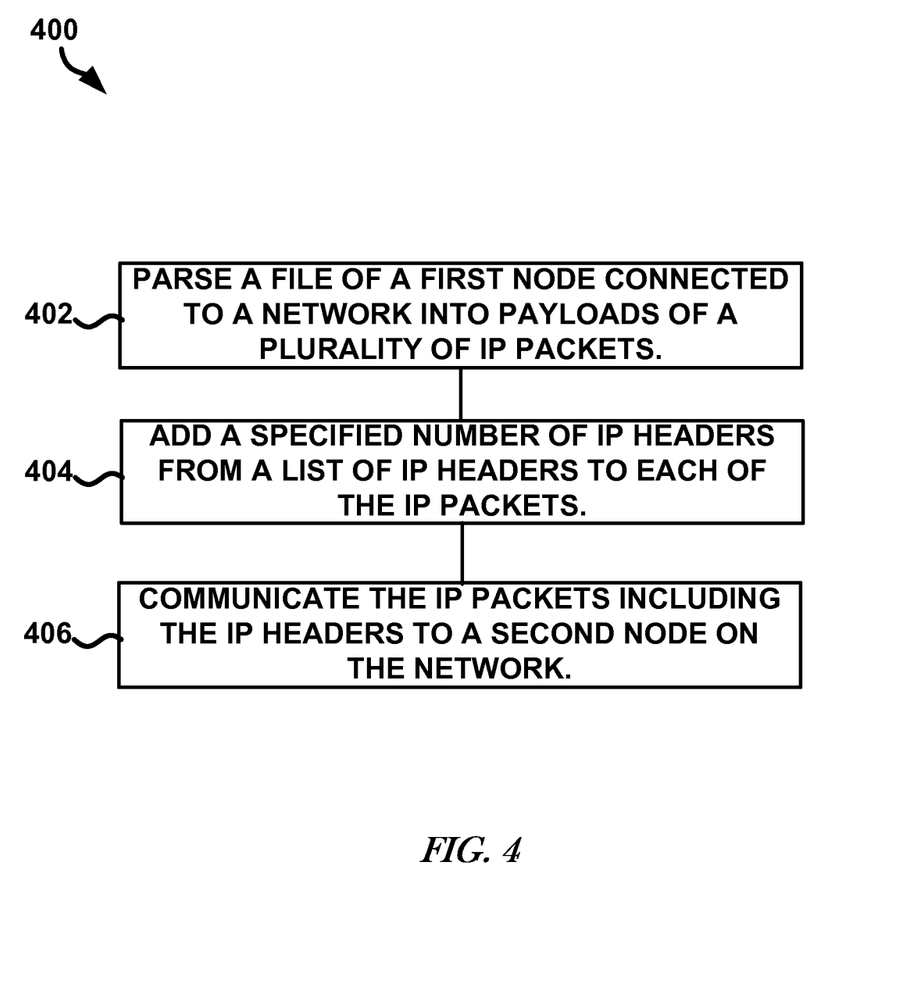
FIG. 4 illustrates, by way of example, a flow diagram of an embodiment of a method for storing data on a network.

FIG. 4 illustrates, by way of example, a flow diagram of an embodiment of a method for storing data on a network. The method 400 as illustrated includes: parsing a file of a first node connected to a network into payloads of a plurality of packets, at operation 402; adding a specified number of IP headers from a list of IP headers to each of the packets, at operation 404; and communicating the IP packets including the IP headers to a second node on the network. The second node on the network can be associated with an address of the outermost header of the packet. The operation at 404 can include adding headers randomly selected to the packet. The operation at 404 can include adding headers from a file or a list of headers, such as a file or list of headers that includes only headers of nodes that are not suspected of propagating malware or are determined be safe or trusted nodes. The operation at 404 can include adding headers to the packet such that the destination node of the packet is the first node.

The method 400 can further include masquerading the communicated IP packets as TLS or SSL packets. The last IP header (the innermost IP header) of the plurality of IP headers can identify an IP address of the first node such that the respective IP packet eventually returns to the first node. The method 400 can further include receiving an acknowledge packet from the second node and removing the file, or only the data corresponding to the payload of the packet, from the first node in response to receiving the acknowledge packet. The method 400 can further include receiving an IP packet of the plurality of IP packets, adding a second plurality of IP headers to the IP packet in response to receiving the IP packet, and re-communicating the IP packet to a third node on the network as determined by the first IP header of the second plurality of IP headers of the IP packet.

The method 400 can further include adding identification data to a payload of each of the IP packets that uniquely identifies the data in a respective IP packet. The method 400 can include encrypting at least a portion of the IP packets (e.g., the payload, such as identification data (the preamble) and/or the file segment). The method 400 can further include removing the file or the data corresponding to the payload of the packet sent to the second node from the machine in response to receiving an acknowledge packet from the second node. The method 400 can further include re-assembling the file using a received plurality of IP packets and an assembly file indicating an order of the IP packets in response to receiving all of the IP packets at the machine.

One or more of the systems or methods discussed herein can be used to store encryption keys in a token ring. Such a token ring can be created by parsing the key into a payload(s) one or more packets and transmitting the packet to a constant series of nodes.

One or more advantages of the systems and methods discussed herein can include storing data without using a physical medium that could be seized, lost, or destroyed. Another advantage of the systems and methods discussed herein can include hindering forensic analysis of data, such as can be due to the data not being saved to a physical disk for an appreciable amount of time. Another advantage of the systems and methods discussed herein can include storing data when no, little, or insufficient local storage is available. Another advantage of the systems and methods discussed herein can include enhancing data security by obfuscating the presence of data. Another advantage of the systems and methods discussed herein can include leaving little or no trace of data in the event of compromise.

Another advantage of the systems and methods discussed herein can include using an existing network infrastructure to save data in locations other than the conventional memory storage device Another advantage of the systems and methods discussed herein can include alleviating local storage constraints by having third parties store data, shifting resource costs use away from the user.

A theoretical storage capacity of a system or method discussed herein can be determined as in Equation 1 (assuming packets are being transmitted in a ring):

$$\sum_{k=1}^{n+1} k = (T(a_n, a_{n+1}) * B(a_n, a_{n+1}))$$ Equation 1

Where n is the number of nodes, $T(a_n, a_{n+1})$ is the length time the packet is in transit, $B(a_n, a_{n+1})$ is the bandwidth between two nodes. In sum, capacity is the time, T, before $a_{n+}$ receives a packet, multiplied by the bandwidth B between nodes $a_n$ and $a_{n+1}$.

Figure 5:
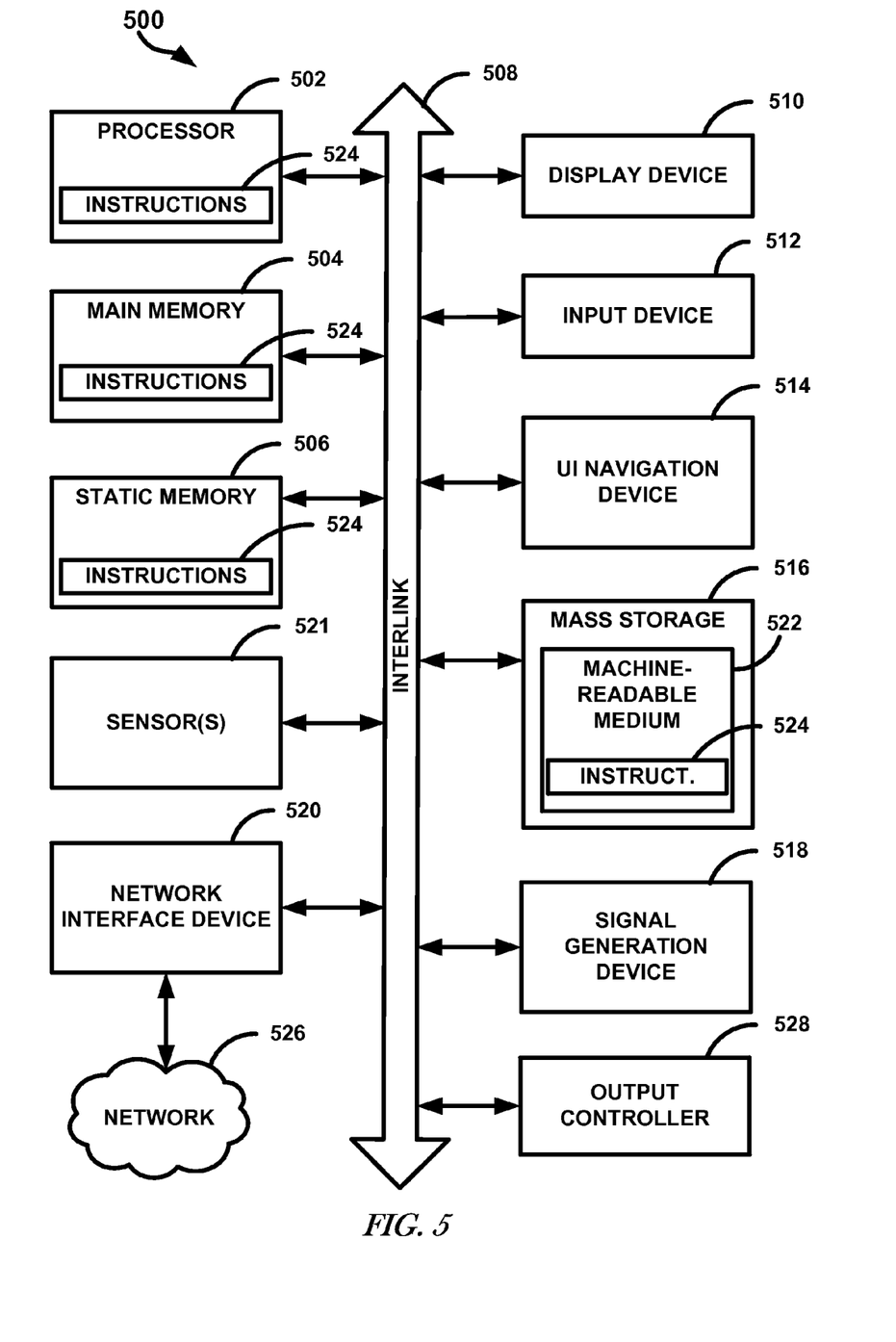
FIG. 5 illustrates, by way of example, a block diagram of an embodiment of a machine upon which one or more processes or operations (e.g., methods) discussed herein may be performed.

FIG. 5 illustrates, by way of example, a block diagram of an embodiment of a machine upon which one or more processes or operations (e.g., methods) discussed herein may be performed. The node 102A-J, the file parsing module 202, the header module 204, the preamble module 206, the re-assembly module 208, the encryption module 210, and/or the error check module can include one or more of the items of the machine 500. The node 102A-J, the file parsing module 202, the header module 204, the preamble module 206, the re-assembly module 208, the encryption module 210, and/or the error check module can be implemented using the machine 500.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 500 can include a hardware processor 502 (e.g., a central processing unit (CPU), a graphics processing unit (GPU), a hardware processor core, or any combination thereof), a main memory 504 and a static memory 506, some or all of which can communicate with each other via an interlink (e.g., bus) 508. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 can include a machine readable medium 522 on which is stored one or more sets of data structures or instructions 524 (e.g., software) embodying or utilized by any one or more of the process or functions described herein. The instructions 524 can also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 can constitute machine readable media.

While the machine readable medium 522 is illustrated as a single medium, the term "machine readable medium" can include a single medium or multiple media (e.g., a centralized or distributed database, and/or associated caches and servers) configured to store the one or more instructions 524.

The term "machine readable medium" can include any medium that is capable of storing, encoding, or carrying instructions for execution by the machine 500 and that cause the machine 500 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

EXAMPLES AND NOTES

The present subject matter can be described by way of several examples.

Example 1 can include or use subject matter (such as an apparatus, a method, a means for performing operations, or a machine readable memory including instructions that, when performed by the machine, can configure the machine to perform acts), such as can include or use a device configured to operate as a first node in a network of nodes, the device comprising network interface circuitry to communicate with other nodes of the network, and comprising processing circuitry to implement a plurality of modules, the modules including a file parsing module to parse a file into a plurality of payloads of respective Internet Protocol (IP) packets, and a header module to add a plurality of IP headers to each of the IP packets, and the processing circuitry to communicate the IP packets including the IP headers to a second node of the network as determined by a first IP header of a respective IP packet so as to store the packet on a network buffer of the second node.

Example 2 can include or use, or can optionally be combined with the subject matter of Example 1, to include or use, wherein the modules further include an encryption module to encrypt a payload of the IP packets.

Example 3 can include or use, or can optionally be combined with the subject matter of at least one of Examples 1-2, to include or use, wherein the processing circuitry is to masquerade the communicated IP packets as Transport Layer Security (TLS) or Secure Sockets Layer (SSL) packets.

Example 4 can include or use, or can optionally be combined with the subject matter of at least one of Examples 1-3, to include or use, wherein an IP header of the plurality of IP headers identifies an IP address of the device such that the respective IP packet is returned to the device.

Example 5 can include or use, or can optionally be combined with the subject matter of Example 4, to include or use, wherein the processing circuitry is to receive an acknowledge packet from the node and remove the file from the device in response to receiving the acknowledge packet.

Example 6 can include or use, or can optionally be combined with the subject matter of Example 4, to include or use, wherein the processing circuitry is to receive an IP packet of the plurality of IP packets and the header module is to add a second plurality of IP headers to a payload of the IP packet in response to receiving the IP packet and the processing circuitry is to re-communicate the IP packet to another node on the network as determined by the first IP header of the IP packet.

Example 7 can include or use, or can optionally be combined with the subject matter of at least one of Examples 1-6, to include or use, wherein the header module is to randomly assign a specified number of IP headers to each IP packet of the plurality of IP packets.

Example 8 can include or use, or can optionally be combined with the subject matter of at least one of Examples 1-7, to include or use, wherein the IP headers assigned to each IP packet are stored in a header file and wherein the header file includes IP headers of trusted nodes and does not include IP headers of suspicious nodes.

Example 9 can include or use, or can optionally be combined with the subject matter of at least one of Examples 1-5 and 7-8, to include or use, wherein the processing circuitry is to receive each of the plurality of IP packets and the modules further comprise a re-assembly module to re-assemble the file using the received plurality of IP packets and an assembly file indicating an order of the IP packets.

Example 10 can include or use, or can optionally be combined with the subject matter of at least one of Examples 1-9, to include or use, wherein the modules further comprise a preamble module to add identification data to a payload of the IP packet that uniquely correlates the payload in the IP packet to a location in a file.

Example 11 can include or use subject matter (such as an apparatus, a method, a means for performing operations, or a machine readable memory including instructions that, when performed by the machine, can configure the machine to perform acts), such as can include or use parsing a file of a first node connected to a network of nodes into payloads of a plurality of Internet Protocol (IP) packets, adding a specified number of random IP headers from a list of IP headers to each of the IP packets, and communicating the IP packets including the IP headers to a second node of the network as determined by a first IP header of a respective IP packet so as to store the packet on a network buffer of the second node.

Example 12 can include or use, or can optionally be combined with the subject matter of Example 11, to include or use masquerading the communicated IP packets as Transport Layer Security (TLS) or Secure Sockets Layer (SSL) packets.

Example 13 can include or use, or can optionally be combined with the subject matter of at least one of Examples 11-12, to include or use, wherein an IP header of the plurality of IP headers identifies an IP address of the first node such that the respective IP packet eventually returns to the first node.

Example 14 can include or use, or can optionally be combined with the subject matter of at least one of Examples 11-13, to include or use, receiving, at the first node, an acknowledge packet from the second node and removing the file from the first node in response to receiving the acknowledge packet.

Example 15 can include or use, or can optionally be combined with the subject matter of at least one of Examples 11-14, to include or use receiving an IP packet of the plurality of IP packets, adding a second plurality of IP headers to the IP packet in response to receiving the IP packet, and communicating the IP packet to a third node on the network as determined by the first IP header of the second plurality of IP headers of the IP packet.

Example 16 can include or use subject matter (such as an apparatus, a method, a means for performing operations, or a machine readable memory including instructions that, when performed by the machine, can configure the machine to perform acts), such as can include or use a non-transitory computer readable storage device including instructions, which when executed by a first node on a network, configure the first node to parse a file stored on the storage device into payloads of a plurality of Internet Protocol (IP) packets, add a plurality of IP headers to each of the IP packets, add identification data to a payload of each of the IP packets that uniquely identifies the data in a respective payload of the payloads of a respective IP packet, encrypt the payloads of the IP packets, and communicate the IP packets including the IP headers to a first node on the network as determined by a first IP header of a respective IP packet so as to store the packet on a network buffer of the second node.

Example 17 can include or use, or can optionally be combined with the subject matter of Example 16, to include or use, wherein an IP header of the plurality of IP headers identifies an IP address of the first node such that the respective IP packet is eventually returned to the first node.

Example 18 can include or use, or can optionally be combined with the subject matter of Example 17, to include or use instructions, which when executed by the first node, configure the first node to remove the data corresponding to the payload of an acknowledged packet from the first node in response to receiving an acknowledge packet from the second node.

Example 19 can include or use, or can optionally be combined with the subject matter of at least one of Examples 16-18, to include or use instructions for adding the plurality of IP headers to each of the IP packets includes adding IP headers to the IP packet from a header file that includes IP headers of trusted nodes and does not include IP headers of suspicious nodes.

Example 20 can include or use, or can optionally be combined with the subject matter of at least one of Examples 16-19, to include or use instructions, which when executed by the first node, configure the first node to re-assemble the file using the received plurality of IP packets and an assembly file indicating an order of the IP packets in response to receiving all of the IP packets at the first node.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means or, in the non-exclusive sense discussed in the previous paragraph, of all elements within the range indicated by the dash. For example, 103A-B means a nonexclusive or of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device configured to operate as a first node in a network of nodes, the device comprising:
   network interface circuitry that communicates with other nodes of the network;
   a memory;
   processing circuitry coupled to the network interface circuitry and the memory, the processing circuitry implements a plurality of modules, the modules including:
   a file parsing module that parses a file into a plurality of payloads of respective Internet Protocol (IP) packets;
   a header module that adds a plurality of IP headers to each of the IP packets, each of the IP headers of the plurality of IP headers identifying a source and a destination for the IP packet, wherein a first IP header of each of the plurality of the IP headers identifies an IP address of the first node as a source, and wherein a last IP header of each of the plurality of the IP headers identifies an IP address of the first node as a destination; and a re-assembly module;

wherein the network interface circuitry further communicates the IP packets including the IP headers to respective other nodes of the network as determined by the first IP header of a respective IP packet so as to temporarily store the file on network buffers of the other nodes; and wherein the processing circuitry receives each of the plurality of IP packets from a respective another node of the nodes, the memory includes an assembly file stored thereon that indicates an order in which the payloads of the IP packets are organized to re-assemble the file, and the re-assembly module re-assembles the file using the received plurality of IP packets and the assembly file.

2. The device of claim 1, wherein the modules further include an encryption module to encrypt the payload of the IP packets.

3. The device of claim 2, wherein the processing circuitry is to masquerade the communicated IP packets as Transport Layer Security (TLS) or Secure Sockets Layer (SSL) packets.

4. The device of claim 1 wherein the processing circuitry is to receive an acknowledge packet from the node and remove the file from the device in response to receiving the acknowledge packet.

5. The device of claim 1 wherein the processing circuitry is to receive an IP packet of the plurality of IP packets and the header module is to add a second plurality of IP headers to the payload of the IP packet in response to receiving the IP packet and the processing circuitry is to re-communicate the IP packet to another node on the network as determined by the first IP header of the IP packet.

6. The device of claim 1, wherein the header module is to randomly assign a specified number of IP headers to each IP packet of the plurality of IP packets.

7. The device of claim 6, wherein the IP headers assigned to each IP packet are stored in a header file and wherein the header file includes IP headers of trusted nodes and does not include IP headers of suspicious nodes.

8. The device of claim 1, wherein the modules further comprise a preamble module to add identification data to the payload of the IP packet that uniquely correlates the payload in the IP packet to a location in the file.

9. A method of temporary data storage comprising:

parsing, using processing circuitry of a first node connected to a network of nodes, a file into payloads of a plurality of Internet Protocol (IP) packets;

adding, using the processing circuitry, a specified number of random IP headers from a list of IP headers to each of the IP packets, each of the IP headers of the plurality of IP headers identifying a source and a destination for the IP packet, wherein a first IP header of each of the plurality of IP headers identifies an IP address of the first node as a source, and wherein a last IP header of each of the plurality of IP headers identifies the IP address of the first node as a destination; and communicating, using network interface circuitry of the first node coupled to the processing circuitry, the IP packets including the IP headers to respective other nodes of the network as determined by the first IP header of a respective IP packet so as to temporarily store the file on network buffers of the other nodes;

receiving each of the plurality of IP packets from a respective another node of the nodes; and re-assembling the file using the received plurality of IP packets and an assembly file stored on a memory coupled to the processing circuitry, the assembly file indicates an order in which payloads of the IP packets are organized.

10. The method of claim 9, further comprising masquerading the communicated IP packets as Transport Layer Security (TLS) or Secure Sockets Layer (SSL) packets.

11. The method of claim 9, further comprising receiving, at the first node, an acknowledge packet from a second node and removing the file from the first node in response to receiving the acknowledge packet.

12. The method of claim 9, further comprising receiving an IP packet of the plurality of IP packets, adding a second plurality of IP headers to the IP packet in response to receiving the IP packet, and communicating the IP packet to a third node on the network as determined by the first IP header of the second plurality of IP headers of the IP packet.

13. A non-transitory computer readable storage device including instructions, which when executed by a first node on a network, configure the first node to:

parse a file stored on the storage device into payloads of a plurality of Internet Protocol (IP) packets;

add a plurality of IP headers to each of the IP packets, each of the IP headers of the plurality of IP headers identifying a source and a destination for a respective IP packet, wherein a first IP header of each of the plurality of IP headers identifies an IP address of the first node as a source, and wherein a last IP header of each of the plurality of IP headers identifies the IP address of the first node as a destination;

add identification data to a respective payload of each of the IP packets that uniquely identifies the data in the payload;

encrypt the payloads of the IP packets;

communicate the IP packets including the plurality of IP headers to respective other nodes on the network as determined by the first IP header of a respective IP packet so as to temporarily store the file on network buffers of the other nodes;

receive each of the plurality of IP packets from a respective another node of the nodes; and re-assemble the file using the received plurality of IP packets and an assembly file stored on the storage device, the assembly file indicates an order in which the payloads of the IP packets are organized.

14. The storage device of claim 13, further comprising instructions, which when executed by the first node, configure the first node to remove the data corresponding to the payload of an acknowledge packet from the first node in response to receiving the acknowledge packet from the second node.

15. The storage device of claim 14, wherein the instructions for adding the plurality of IP headers to each of the IP packets includes adding IP headers to the IP packet from a header file that includes IP headers of trusted nodes and does not include IP headers of suspicious nodes.

* * * * *

UNITED STATES PATENT AND TRADEMARK OFFICE
CERTIFICATE OF CORRECTION

PATENT NO. : 9,774,683 B2  
APPLICATION NO. : 14/672468  
DATED : September 26, 2017  
INVENTOR(S) : Charles Williams Page 1 of 1

It is certified that error appears in the above-identified patent and that said Letters Patent is hereby corrected as shown below:

On the Title Page

On page 2, in Column 1, under "Other Publications", Line 7, delete "Opinion.mailed" and insert --Opinion mailed-- therefor In the Specification In Column 2, Line 56, delete "minter," and insert --printer,-- therefor In Column 2, Line 57, delete "like, in" and insert --like. In-- therefor In Column 2, Lines 62-63, delete "and; or" and insert --and/or-- therefor In Column 3, Line 55, delete "208" and insert --206-- therefor In Column 4, Line 11, delete "214," and insert --212,-- therefor In Column 7, Line 23, delete "$a_{n+}$" and insert --$a_{n+1}$-- therefor In the Claims In Column 13, Line 27, in Claim 4, delete "claim 1" and insert --claim 1,-- therefor In Column 13, Line 31, in Claim 5, delete "claim 1" and insert --claim 1,-- therefor Signed and Sealed this  
Fifth Day of May, 2020

Andrei Iancu  
*Director of the United States Patent and Trademark Office*